United States Patent [19]
Fletcher et al.

[11] 3,740,725

[45] June 19, 1973

[54] AUTOMATED ATTENDANCE ACCOUNTING SYSTEM

[76] Inventors: James C. Fletcher, Administrator of the National Aeronautics and Space Administration with respect to an invention of; Carl P. Chapman, La Crescenta; Richard W. Andersen, Los Angeles; William D. Hodgson, La Crescenta, all of Calif.

[22] Filed: June 16, 1971

[21] Appl. No.: 153,543

[52] U.S. Cl. .......... 340/172.5
[51] Int. Cl. .......... G06f 3/04
[58] Field of Search .......... 340/172.5

[56] References Cited

UNITED STATES PATENTS

| | | | |
|---|---|---|---|
| 3,407,387 | 10/1968 | Looschen | 340/172.5 X |
| 3,308,439 | 3/1967 | Tink | 340/172.5 |
| 3,585,598 | 6/1971 | Hudson | 340/172.5 |
| 3,351,919 | 11/1967 | Milford | 340/172.5 |
| 3,408,632 | 10/1968 | Hauck | 340/172.5 |
| 3,413,612 | 11/1968 | Brooks | 340/172.5 |
| 3,539,998 | 11/1970 | Belcher | 340/172.5 |
| 3,573,740 | 4/1971 | Berger | 340/172.5 |
| 3,626,382 | 12/1971 | Pedersen | 340/172.5 |

*Primary Examiner*—Raulfe B. Zache
*Assistant Examiner*—Sydney R. Chirlin
*Attorney*—Monte F. Mott, Paul F. McCaul and John R. Manning

[57] ABSTRACT

An automated accounting system useful for applying data to a computer from any or all of a multiplicity of data terminals is disclosed. The system essentially includes a preselected number of data terminals which are each adapted to convert data words of decimal form to another form, i.e., binary, usable with the computer. Each data terminal may take the form of a keyboard unit having a number of depressable buttons or switches corresponding to selected data digits and/or function digits. A bank of data buffers, one of which is associated with each data terminal, is provided as a temporary storage. Data from the terminals is applied to the data buffers on a digit by digit basis for transfer via a multiplexer to the computer. A priority interrupt generator is employed to provide the computer with a signal indicating that stored data is available and being held in at least one of the data buffers for transfer to the computer. Upon receipt of such signals, the transfer of data is initiated by the computer controlling the multiplexer to scan the bank of buffers, by groups, in accordance with a programmed sequence. Available data is transferred from a buffer in which it is stored, when the buffer is scanned. The data may be first confirmed for accuracy. Each data buffer is individually reset by the computer subsequent to the transfer of data stored therein. A visual indication is provided at the data terminal keyboard, from which the data originated, after each successful transfer of a complete data word.

27 Claims, 11 Drawing Figures

Patented June 19, 1973

3,740,725

6 Sheets-Sheet 1

INVENTORS.
CARL P. CHAPMAN
RICHARD W. ANDERSEN
WILLIAM D. HODGSON

BY Paul F. McCaul
Monte F. Mott

ATTORNEYS.

INVENTORS.
CARL P. CHAPMAN
RICHARD W. ANDERSEN
WILLIAM D. HODGSON

BY [signatures]

ATTORNEYS.

INVENTORS.
CARL P. CHAPMAN
RICHARD W. ANDERSEN
WILLIAM D. HODGSON
BY
ATTORNEYS

Patented June 19, 1973 3,740,725

6 Sheets-Sheet 4

INVENTORS.
CARL P. CHAPMAN
RICHARD W. ANDERSEN
WILLIAM D. HODGSON

BY

ATTORNEYS.

INVENTORS.
CARL P. CHAPMAN
RICHARD W. ANDERSEN
WILLIAM D. HODGSON
BY
ATTORNEYS.

INVENTORS.
CARL P. CHAPMAN
RICHARD W. ANDERSEN
WILLIAM D. HODGSON

BY [signature]
[signature]

ATTORNEYS.

AUTOMATED ATTENDANCE ACCOUNTING SYSTEM

ORIGIN OF THE INVENTION

The invention disclosed herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention generally relates to peripheral equipment usable with a computer for enabling data to be applied to the computer. More specifically, the present invention concerns an automated accounting system which enables data to be transferred to a computer from a multiplicity of data terminals and which is particularly suitable for employment at an educational facility such as an elementary school, high school, etc., for continually collecting, consolidating, updating and maintaining student and faculty information.

2. Description of the Prior Art

There are a great number of prior art systems usable with computers for the purpose of transferring data to a computer from a multiplicity of data input terminals. Of common familiarity are those prior art systems used by ticket agencies for recording the sale of tickets at a central point, by airline ticket counters for reporting the availability of tickets and/or seats on selected flights, and by supermarkets for reporting the status of inventory items. None of these prior art systems are, however, known to have the capacity to cope with the problems and requirements presented by an educational facility when such a system is to be employed for continually obtaining and maintaining student information.

Most educational facilities and systems perform the task of collecting and maintaining student information by using time worn manual accounting techniques. For example, student attendance information is typically accumulated by a teacher preparing a written attendance report for each class period. The report is hand carried to a central office at the school. The teacher's entries are then manually transferred to a more permanent record for storage and/or subsequent forwarding to a school district office. The mere fact that the entire accounting process is manually performed by a number of different people presents the strong likelihood that errors are created, accumulated, and then compounded. Further, such manual performance is foolishly time consuming and therefore wasteful of faculty and administration time. Moreover, it has been empirically determined that school records are oftentimes incomplete, particularly where large student bodies are concerned. Even greater accounting complications are created and experienced when large numbers of transient students are involved.

Student information is useful to present-day educational facilities for a number of reasons other than simply satisfying the requirement for monitoring students progress. For example, student body attendance is often the factor on which state and/or federal financial assistance is based. Recognizing that errors are common, governmental agencies have instituted auditing procedures to ensure accuracy. An automated system would not only ensure accuracy but would also eliminate the need for such audit procedures and hence produce a governmental savings. As a further example, school administrators are frequently faced with having to solve problems attendant to student unrest and campus disturbances. It has been found that such disturbances sometimes can be predicted, and possibly preempted and avoided, by monitoring the attendance records and campus whereabouts, i.e., is a student in the proper classroom, of known and/or suspected instigators. Quite obviously, manual accounting techniques are totally unsuitable for this purpose when such checking must be performed on a class period basis or at other similarly short and regular time intervals through a day. An automated system would make student information continually available at a minute's notice.

It is clear that there is an urgent need for a system that will enable student information to be continually collected, consolidated and held immediately available to the faculty for whatever statistical manipulation may be required to meet a contemporaneous problem.

OBJECTS AND SUMMARY OF THE INVENTION

It is therefore a primary object of the present invention to provide an automated accounting system usable with a computer for collecting, consolidating, updating and storing data concerning individual students and faculty members in an educational facility.

It is another object of the present invention to provide a system that is capable of providing data to a computer from a multiplicity of data input terminals.

It is another object of the present invention to provide a data system, the operation of which is controlled by computer programs in accordance with the invention.

It is a further object of the present invention to provide a system including a plurality of data input terminals that are independent and which simultaneously operate to apply multibit data words to a computer on a bit by bit basis.

It is a still further object of the present invention to provide a data transfer system including a number of data input terminals and individually associated data buffers that are scanned in accordance with a programmed sequence to effect data transfer.

It is a yet further object of the present invention to provide data input terminals which serve to convert data from a decimal form to another coded form suitable for application to a computer.

Briefly described the present invention involvs an automated accounting system for enabling the application, or transfer, of data to a computer from any one or more of a plurality of data input terminals.

More particularly, the subject accounting system includes a multiplicity of data input terminals in the form of keyboard operated units. Each data input terminal is associated with one of a corresponding number of data buffer units which are each adapted to store data words, on a digit by digit basis, for transfer to a computer. The buffers are adapted to provide a signal to the computer, through a priority interrupt generator, whenever data is available for transfer in any one or more of the buffers. A multiplexer serves to effect transfer of data from the buffers to the computer by scanning and successively interrogating the buffers by groups and in accordance with a programmed sequence. Each buffer from which data is transferred to the computer is individually reset and thereby primed for receipt of another data digit. The system may include circuitry for establishing a visual "entry" indication at data input terminals whenever a preselected number of data digits, which together form a complete data word, is successfully transferred to the computer.

The features that characterize the novelty of the present invention are set forth with particularity in the appended claims. Both the organization and manner of operation of the invention, as well as other objects and the attendant advantages thereof, may be best understood by reference to the following detailed description considered in conjunction with the accompanying drawings wherein like reference symbols designate like parts through the figures thereof.

DESCRIPTION OF THE PREFERRED EMBODIMENT

Figure 1:
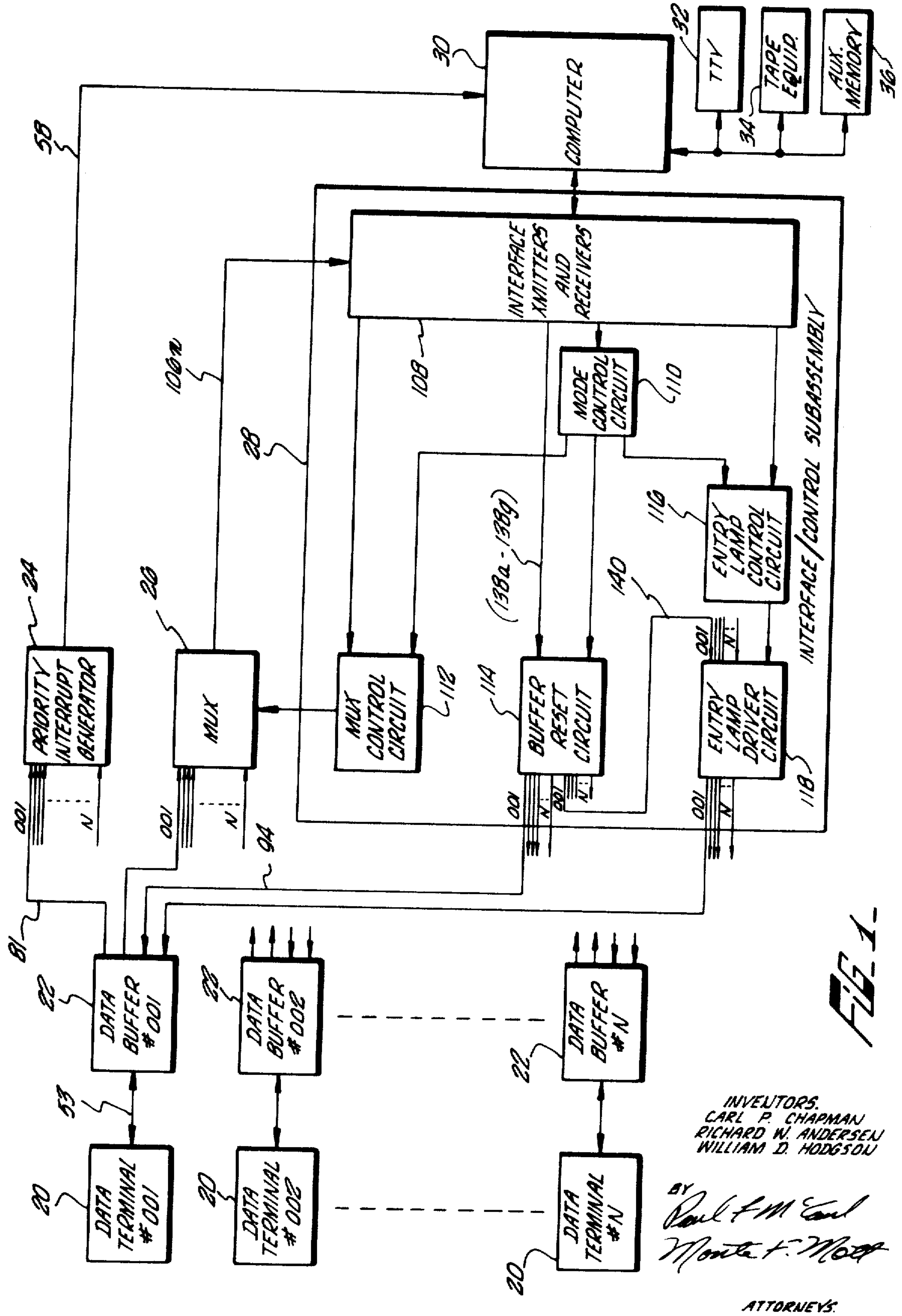
FIG. 1 is a schematic block diagram illustrating a preferred embodiment of an automated accounting system in accordance with the present invention.

Referring to FIG. 1, an automated accounting system, in accordance with the present invention, essentially includes a multiplicity of data terminals 20, a corresponding number of data buffers 22, a priority interrupt generator 24, a multiplexer 26, and an interface/-control sub-assembly 28 which provides the primary connection between a computer 30 and the accounting system. Peripheral equipment such as a teletypewriter 32, tape preparation and/or reading equipment 34, and an auxiliary data memory device 36 also may be employed with the computer 30.

Each of the data terminals 20 is intended to be capable of being positioned at different user stations or locations, as in classrooms, when the subject system is employed at an educational facility for the purpose of automated student accounting. The remainder of the components included in the system may be situated at a central point, such as an administrative office, etc.

Each data input terminal 20 is intended to readily enable a user to have data words, in essentially decimal form, transferred through the system to the computer 30 in an appropriate form, i.e., binary, usable by the computer 30. To this end, a data input terminal 20 may assume any functional appearance such as that of a keyboard unit having a series of depressable buttons corresponding to desired decimal digits and function digits.

For the purpose of the following description, a data word shall mean a five digit word including four decimal digits followed by a single function digit, of course, any other combination may be used to form data words. Each of the data digits are converted by a keyboard to a binary word including four binary bits. It is to be understood that any number of binary bits may be used to form a binary word and that the fewest number of bits that can be used is dictated by the number of different data digits that are used in a system. In the present system, where a keyboard having fifteen different data digits is employed, the use of four bit binary words is sufficient.

Figure 2:
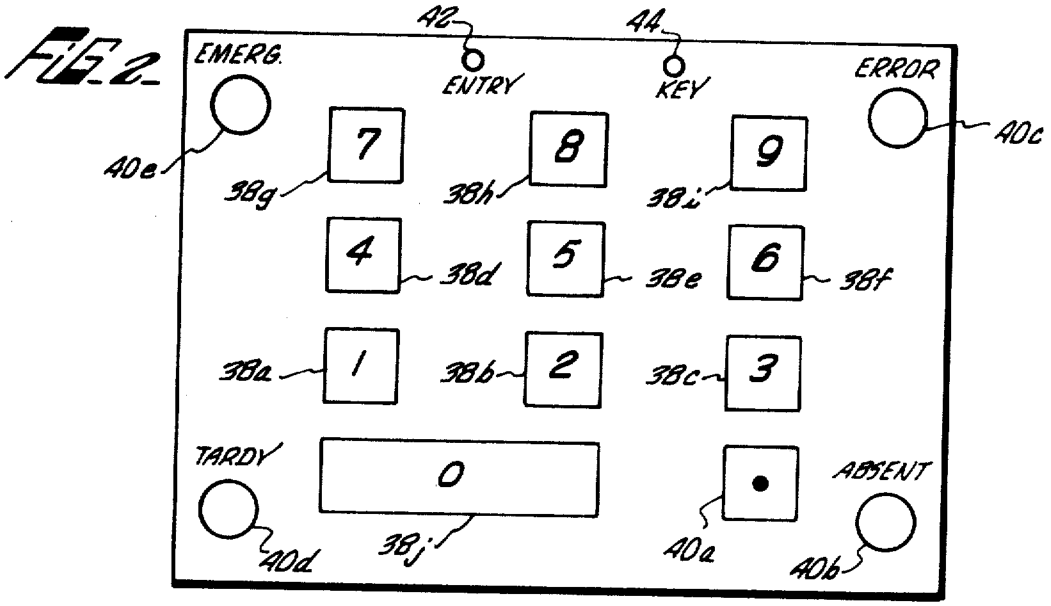
FIG. 2 is a schematic diagram illustrating an exemplary functional configuration for the keyboard of a data input terminal.

As shown in FIG. 2, an exemplary keyboard may include ten buttons 38*a*–38*j* to accommodate ten different decimal digits and five buttons 40*a*–40*e* to accommodate five different function digits. When depressed, each of these buttons will serve to close an associated switch and hence develop a signal representing a selected binary word as is discussed hereinafter in greater detail. On the exemplary keyboard, the ten buttons 38*a* to 38*j* have been made to successively correspond to the ten decimal digits 1 to 9 and 0. The five buttons 40*a* to 40*e* have been made to correspond to five desired functions. In a school application, these function buttons may be adapted to generate "absent," "tardy," "error" and "emergency" signals in addition to an access signal that may be symbolized by a "dot." The "absent" and "tardy" signals may be used to report the status of students. The "error" signal may be used to correct an erroneous status report and the "emergency" signal may be used to trigger a call for assistance. The access or "dot" function may be adapted for use when a user is either gaining access to or relinquishing control of a data input terminal 20.

A pair of indicator lamps, respectively designated as an "entry" lamp 42 and a "key" lamp 44 may be provided to indicate a successful operation of a keyboard. In the exemplary system the entry lamp 42 may be used to indicate that a data word has been successfully transferred to the computer 30. The key lamp 44 may be used to indicate that a terminal 20 is receiving power and that a keyboard button has been sufficiently depressed to develop a signal for transfer to the computer 30. If, for any reason, a button is not sufficiently depressed, the key lamp 44 will fail to become illuminated. The user would then simply depress the same button again.

Considering an exemplary operation of a data terminal keyboard, a teacher may produce an entry by first gaining access to a data terminal 20. This may be accomplished by the teacher entering his four decimal digit identification number followed by an access or "dot" function. After the identification number is authenticated and access to a terminal 20 is gained, the teacher may successively depress the buttons for the decimal digits forming a student's number and then an appropriate function button such as the absent, tardy, or error button. Taking a specific example, a student with the identification number 9019 may be reported as absent, by a teacher having access to a keyboard, by the successive depression of the buttons representing the digits 9, 0, 1 and 9 followed by a depression of the absent button **40*b*. The computer 30 may be programmed to have the latest of several entries replace any earlier entry made in the same class period. Accordingly, if the same student were to later enter the classroom, and the teacher wished to report the student as being tardy, then the student's number 9019 would again be punched on the keyboard followed by a depression of the tardy button 40*d*. In the alternative, if the teacher desired to cancel, or erase, a previous entry concerning a student having the number 9019, that studnet's number would be punched on the keyboard and be followed by a depression of the error button 40*c***.

The emergency button 40e may be included to enable transmission of a signal indicating that assistance is needed at the user station and may be used to energize any appropriately placed signalling device, i.e., a light, siren, etc. Unique signals for different emergencies may be provided, if desired, by having different data words represent different emergencies, just as different data words are used to identify different students.

Figure 3:
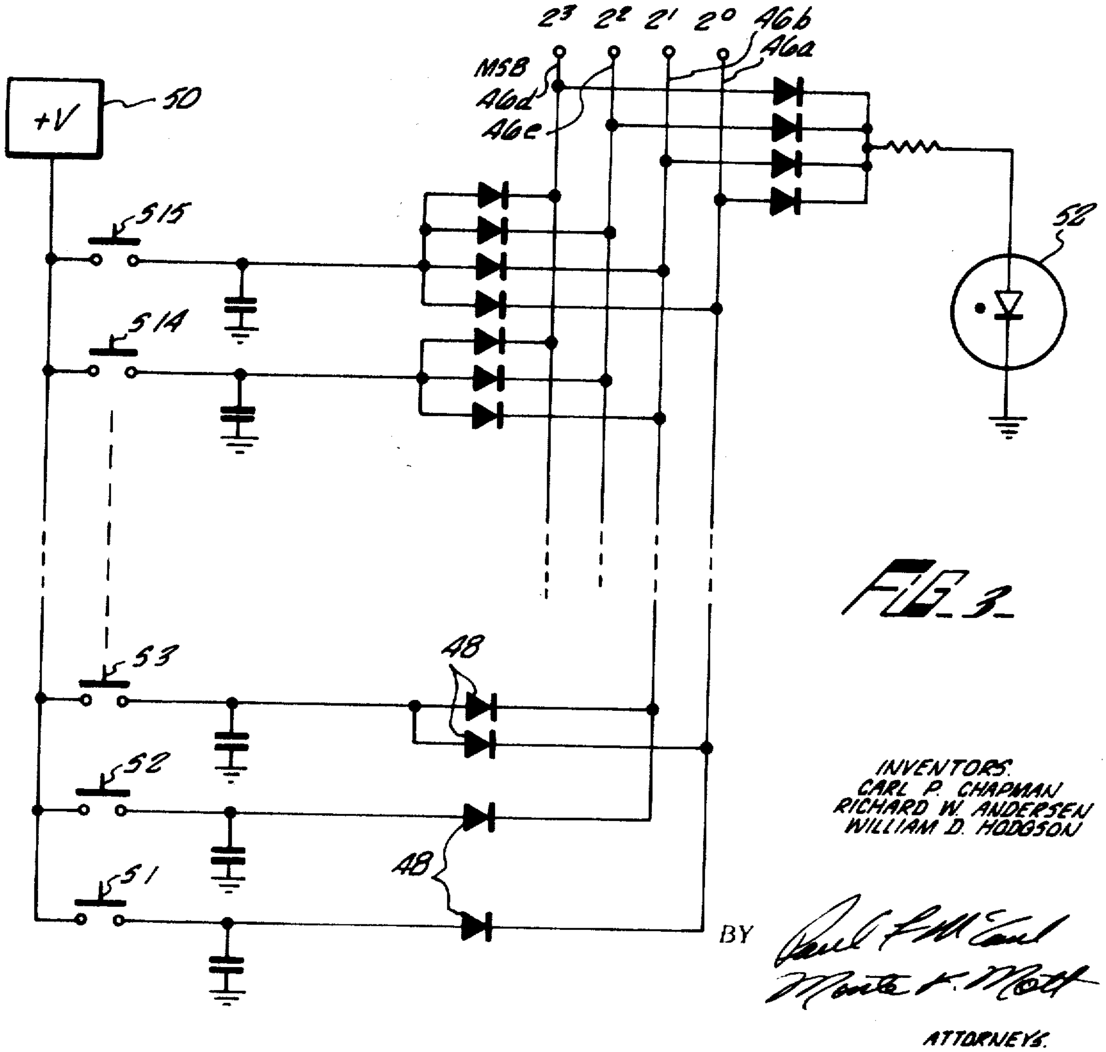
FIG. 3 is a schematic diagram illustrating a circuit that may be used in conjunction with data input terminals.

Referring to FIG. 3, a circuit suitable for use as a data input terminal 20 may include a plurality of switches S1–S15 (switches S3–S13, not illustrated) which respectively correspond to individual buttons **38*a*–38*j* and 40*a*–40*e* provided on the keyboard shown in FIG. 2. Each of the switches S1–S15 are adapted to provide predetermined output signals over a set of four output lines 46*a*–46*d*** which each correspond to one of the binary bits included in a four-bit binary word. It is to be understood that although a four bit binary word is described, that binary words having any number of bits may be used, as is required by the number of switches involved.

Specifically, an output line **46*a* may correspond to the least significant bit of a binary word that is formed when the four lines 46*a*–46*d* are considered collectively. Similarly, an output line 46*d*** may represent the most significant binary bit.

The switches S1-S15 are simply connected to the output lines **46*a*–46*d*, through an array of diodes 48 such that a d.c. voltage source 50 is selectively connected to the output lines 46*a*–46*d* whenever a switch is closed. For example, the switch S1, which may correspond to the keyboard button 38*a* for the decimal digit 1, may be closed to connect the voltage source 50 to the output line 46*a*. The output line 46*a* would as a result assume a voltage level near that of the voltage source 50 while the remaining output lines 46*b*, 46*c* and 46*d* would remain at an ambient voltage level, i.e., ground potential. Collectively considered, the output lines would thus form a binary word 0001. Similarly, the switch S14 is connected to the output lines 46*b*, 46*c* and 46*d* such that these lines will assume the voltage level of the source 50**, when the switch S14 is closed, to provide the binary word 1110 as an output signal. A complete resume of an exemplary scheme for decimal digits and function digits is presented by Table I hereinbelow:

TABLE I

| Decimal/Function Digit | Keyboard Button | Switch | Binary word at output lines 46a–46d |
|---|---|---|---|
| 1 | 38a | S1 | 0001 |
| 2 | 38b | S2 | 0010 |
| 3 | 38c | S3 | 0011 |
| 4 | 38d | S4 | 0100 |
| 5 | 38e | S5 | 0101 |
| 6 | 38f | S6 | 0110 |
| 7 | 38g | S7 | 0111 |
| 8 | 38h | S8 | 1000 |
| 9 | 38i | S9 | 1001 |
| 0 | 38j | S10 | 1010 |
| Dot | 40a | S11 | 1011 |
| Absent | 40b | S12 | 1100 |
| Error | 40c | S13 | 1101 |
| Tardy | 40d | S14 | 1110 |
| Emergency | 40e | S15 | 1111 |

The key lamp 44, as shown in FIG. 2, simply may be a light emitting diode 52 having one terminal, i.e., anode, connected to each of the output lines **46*a*–46*d* and the other terminal connected to ground. With this connection, whenever any of the output lines 46*a*–46*d* are connected to the voltage source 50, by closure of one of the switches S1–S14, the light emitting diode 52 will become biased into conduction and hence become illuminated. Naturally, failure to properly close a switch by not adequately depressing a keyboard button would allow the diode 52** to remain in an ambient unlit condition.

Each binary word that is generated at a data terminal 20 is transmitted to a data buffer 22 associated therewith. Accordingly, the leads 53 (FIG. 1) that connect associated terminals 20 and buffers 22 include at least the four output lines **46*a*–46*d***. Other lines, such as power lines, may also be included as is necessary.

The data buffers 22 are adapted to store a single binary word corresponding to a single decimal digit. Thus, any binary word stored in a buffer 22 must be transferred to the computer 30, through the multiplexer 26 and the interface/control sub-assembly 28, before the buffer 22 is reset and hence be ready to accept another binary word.

Each data buffer 22 is adapted to provide a "full" signal to the priority interrupt generator 24 whenever a binary word is stored therein. The priority interrupt generator 24 responds by providing an appropriate signal to the computer 30 indicating that one of the buffers 22 has a binary word stored therein.

The use of priority interrupt generators in conjunction with certain computers is well known in the prior art and such priority interrupt generators may assume a variety of different configurations to meet the requirements of a system. In the subject automated accounting system, the priority interrupt generator 24 may be functionally described as a large OR gate. The logic diagram presented by FIG. 4 illustrates a suitable priority interrupt generator 24 that may be fabricated by using "negative logic" devices.

Figures 4, 6:
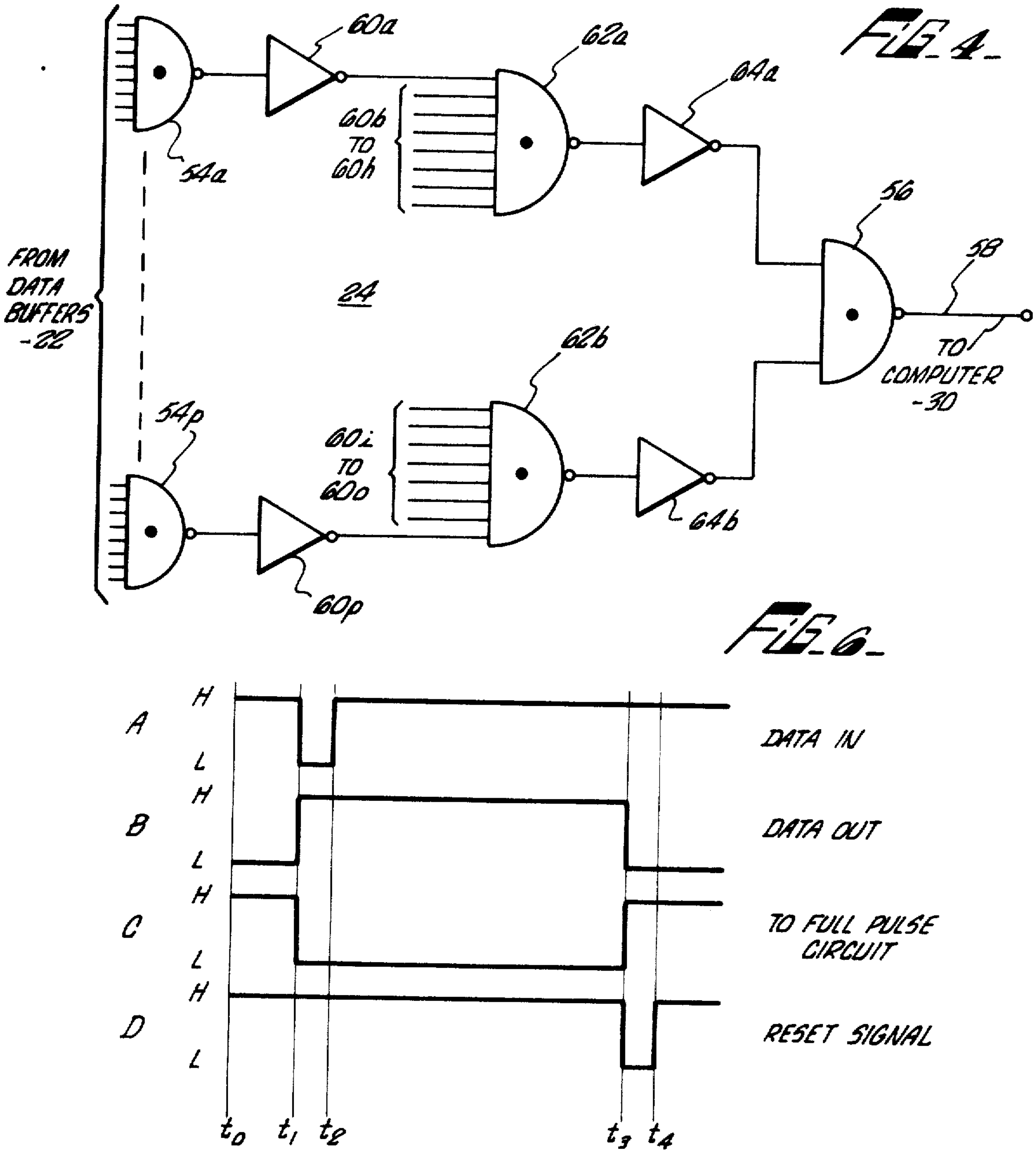
FIG. 4 is a schematic diagram illustrating a circuit that may be used to form a priority interrupt generator suitable for use with the present invention.
FIG. 6 is a graphic diagram illustrating a series of waveforms that are useful in explaining the operation of a latching circuit that may be included in the buffer circuit shown by FIG. 5.

Referring to FIG. 4, a bank of sixteen NAND gates **54*a*–54*p* are adapted to receive the earlier mentioned "full" signals from the individual data buffers 22. A NAND gate 56 is adapted to ultimately provide a logical "high" signal at an output terminal 58 of the priority interrupt generator 24** in response to a "full" signal. Assuming that the system includes 128 data terminals 20 and an equal number of data buffers 22, then the 16 NAND gates 54*a*–54*p* (NAND gates 54*b*–54*p*, not illustrated) will each be connected to receive a "full" signal from 8 of the 128 data buffers 22. For example, the NAND gate 54*a* may be connected to the first eight data terminals, i.e., 001 to 008 while the NAND gate 54*p* may be connected to the last eight terminals, i.e., 121 to 128.

Assuming that the "full" signal from a buffer 22 is adapted to be a negative going pulse, or a logical "low" signal, a NAND gate upon receipt thereof will assume a logical "high" state. Thus a "full" signal applied to the NAND gate 54*a* from any of the first eight (001–008) data terminals 20 will cause such NAND gate 54*a* to produce a logical "high" signal which is adapted to be inverted by an inverter 60*a*. Fifteen other such inverters 60*b*–60*p* (inverters 60*b*–60*o*, not illustrated) are connected to receive the respective outputs of the other fifteen NAND gates 54*b*–54*p*. The output of the inverter 60*a* is connected as an input to a NAND gate 62*a*, along with the outputs of seven other inverters, i.e., 60*b*–60*h*. Another NAND gate 62*b* is similarly connected to receive an input signal from the remaining eight inverters 60*i*–60*p* associated with the NAND gates 54*i*–54*p*.

Operationally, the "low" signals produced by the inverters 60*a*–60*p* are applied as inputs to the respective NAND gates 62*a* and 62*b* connected thereto. The NAND gates 62*a* and 62*b* are adapted to respond by providing logical "high" signals at the outputs thereof, which signals are adapted to be inverted to a logical "low" signal by a pair of inverters 64*a* and 64*b* that are respectively connected to receive the outputs of the NAND gates 62*a* and 62*b*. The "low" signals provided by the respective inverters 64*a* and 64*b* are applied as inputs to the output NAND gate 56 and will cause the desired logical "high" signal to be provided at the output terminal 58 of the priority interrupt generator 24. Application of this "high" signal, appearing at the terminal 58, to the ordinary priority interrupt module of the computer 30 will thus signal the computer 30 that one of the data buffers 22 has a binary word stored therein.

Figure 5:
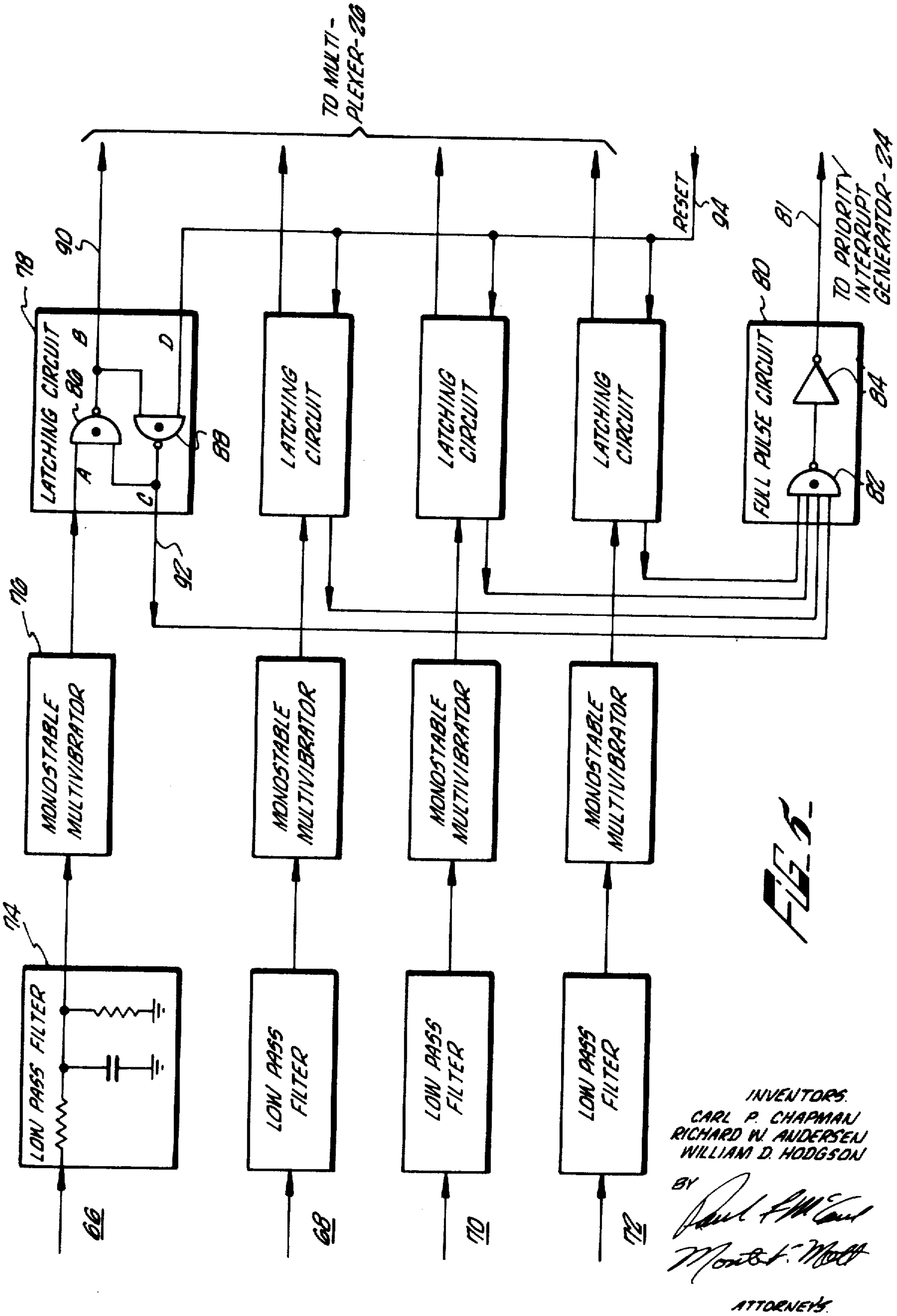
FIG. 5 is a schematic diagram illustrating a circuit that may be used to provide a data buffer in accordance with the present invention.

Referring now to FIG. 5, a data buffer 22 may include a plurality of identical channels 66, 68, 70 and 72 to accommodate each of the binary bits applied thereto from a data terminal 20. Each of these identical channels may include a low pass filter 74, a monostable multivibrator 76, and a latching circuit 78 which are serially connected. The low pass filter 74, if employed, serves to remedy the problems presented by line noise. Both the low pass filter 74 and the multivibrator 76 may be of any conventional configuration well known in the prior art.

Each of the latching circuits 78 is adapted to provide a desired binary bit signal to the multiplexer 26 for subsequent transfer to the computer 30 via the interface/-control sub-assembly 28. The latching circuits 78 also provide an output signal to a "full" pulse circuit 80 which serves to provide the earlier mentioned "full" signal to the priority interrupt generator 24. As shown by FIG. 5, the full pulse circuit 80 may simply serve the function of an OR gate, of which the output signal may be maintained at or converted to an appropriate level. When fabricated by using negative logic devices, a NAND gate 82 and an inverter 84 may be connected in series.

The latching circuits 78 may each include a pair of NAND gates 86 and 88 which have the respective output terminals thereof connected to one of the two input terminals of the other NAND gate. Data is applied as the second input signal to one of the NAND gates, i.e., NAND gate 86, while reset pulses are applied as the second input signal to the other NAND gate 88. Binary data is applied to the multiplexer 26 via an output lead 90 of the NAND gate 86. The output of the NAND gate 88 is applied to the full pulse circuit 80 via a lead 92 to produce the desired full signals.

The operation of the latching circuit 78 can be best understood by further reference to the waveforms of FIG. 6. The letters identifying the respective waveforms have also been used in FIG. 5 to identify the terminals of the latching circuit 78 to which the waveforms correspond. Assuming that the data applied to the latching circuit is in the form of a negative pulse (waveform A) provided by the multivibrator 76, the NAND gate 86 will respond by assuming a logical "high" state and will thereby produce a "high" signal at the output terminal 90 thereof (waveform B). Assuming that a reset signal applied to the latching circuit 78 via a lead 94 is also in the form of a negative pulse (waveform D), and the ambient input signal is thus maintained at a "high" level, the output of the NAND gate 88 will be converted to a logical "low" state when the output of the NAND gate 86 is converted to a logical "high" state (see waveform C). Once data has been applied to the latching circuit 78, the NAND gates 86 and 88 will maintain their respective states until a reset signal (waveform D) is applied to the NAND gate 88 via the lead 94, at which time the NAND gate 86 will revert to an ambient logical "low" state while the NAND gate 88 reverts to an ambient logical "high" state.

A summary of the above described operation is presented in tabular form by Table II included hereinbelow.

TABLE II

| CONDITION/ OPERATION | TIME | TERMINALS/WAVEFORMS A | B | C | D |
|---|---|---|---|---|---|
| Ambient | ($t_0$) | H | L | H | H |
| Data in | ($t_1$) | L | H | L | H |
| Ambient with data in | ($t_2$) | H | H | L | H |
| Reset | ($t_3$) | H | L | H | L |
| Ambient | ($t_4$) | H | L | H | H |

Each data buffer 22 may thus be understood to accept, at each of the channels 66, 68, 70 and 72, binary bit signals from an associated data terminal 20, and together store the binary word until such time as the buffer 22 is reset. This resetting will occur after the binary data has been transferred to the computer 30 via the multiplexer 26.

Assuming that each binary word includes four binary bits, at least four data leads will be used to connect each data buffer 22 to the multiplexer 26. Assuming further that the multiplexer is adapted to have 16 input leads corresponding to the 16 inputs of the computer 30, then the multiplexer 26 may be conveniently adapted to simultaneously interrogate four data buffers and apply the binary data stored therein to the computer 30. Otherwise stated, the multiplexer 26 operates to sequentially convert the 512 output leads of the 128 buffers 22 to the sixteen terminals of the computer. Taking the buffers 22 in groups of four, i.e., sixteen buffer output leads at a time, this can be accomplished in 32 successive steps. Obviously, the bit length of the binary words, and the number of available computer lines, will determine the maximum number of buffers 22 that may be simultaneously interrogated. For example, a sixteen terminal multiplexer would be capable of simultaneously interrogating two data buffers if the binary words stored therein were of eight bit length. Any suitable multiplexer of conventional design may be employed.

Figure 7:
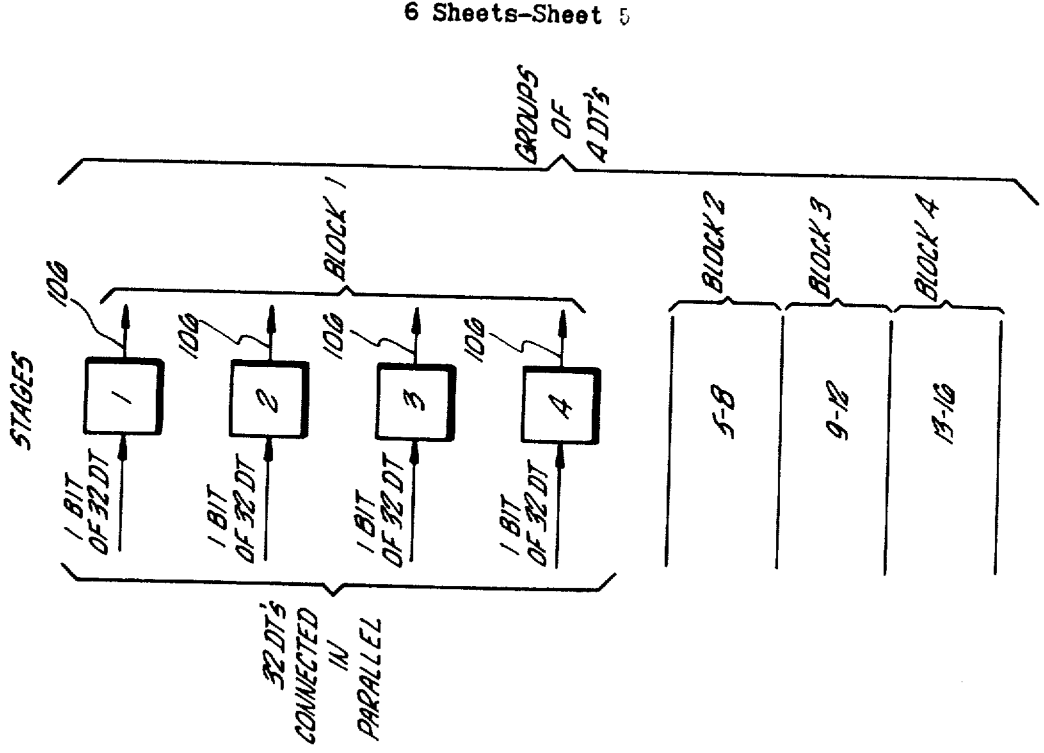
FIG. 7 is a schematic diagram illustrating an exemplary arrangement of multiplexer stages that may be used to form a mutliplexer for the subject system.

Referring to FIG. 7, an exemplary multiplexer 26 suitable for use in conjunction with the present invention may be fabricated with a plurality of stages. As shown, sixteen stages corresponding to the sixteen input lines may be separated into four blocks of four stages each wherein each block instantaneously accommodates the four output lines of a single data buffer 22, the respective stages in a block each receiving one of the four output lines of a data buffer 22. A multiplexer having the exemplary sixteen stages may thus simultaneously accommodate associated data terminals 20 and data buffers 22 in groups of four.

Specifically, each of the sixteen multiplexer stages may be required to accommodate one of the output terminals 90 from each of thirty-two different data buffers 22 such that each block of four multiplexer stages accommodates 32 different buffers 22. Thus, 128 buffers 22 may be accommodated by four blocks wherein the first block may accommodate the first thirty-two data buffers, while the second block accommodates the second thirty-two data buffers, etc.

Figure 8:
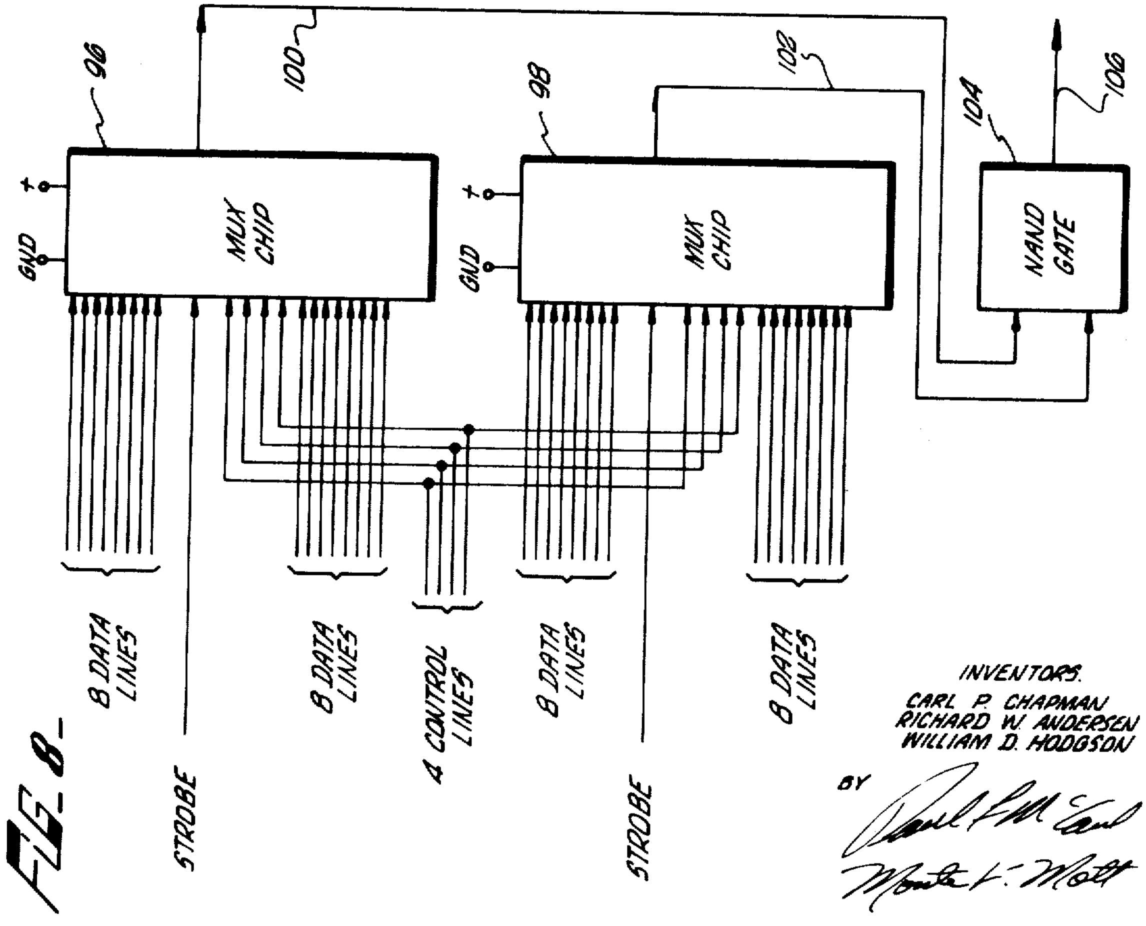
FIG. 8 is a schematic diagram illustrating a multiplexer stage that may be used with the system of the present invention.

As shown by FIG. 8, each of the multiplexer stages may include a pair of commercially available multiplexer chips 96 and 98 such as those sold by Texas Instrument Company as type SN74150N. The multiplexer chips 96 and 98 typically are each provided with sixteen data input leads. Data signals available at any one of these sixteen data input leads may be selected to be provided at the respective output lines 100 and 102 of the multiplexer chips 96 and 98, by the application of appropriate control signals. Each of the chips 96 and 98 are typically provided with four control lines and a strobe line for this purpose. In the illustrated configuration, any given binary address provided over the four control lines will identify two data lines, one on each of the chips 96 and 98. The desired one of 32 data lines is thus selected by applying a strobe signal to only one of the two chips 96 and 98 at any given time. As shown, a pair of power terminals are typically provided on each chip for the purpose of having power appropriately applied thereto.

The output terminals 100 and 102 of the respective multiplexer chips 96 and 98 may be connected to the input terminals of a gating circuit 104 which serves as OR function by providing an appropriate "high" or "low" binary data signal at a multiplexer stage output terminal 106.

Briefly returning to FIG. 1, the interface/control subassembly 28 serves to connect the computer 30 to the rest of the components of the subject accounting system. As shown, the interface/control sub-assembly 28 includes a bank of interface transmitters and receivers 108, a mode control circuit 110, a multiplexer control circuit 112, a buffer reset circuit 114, an entry lamp control circuit 116, and an entry lamp driver circuit 118.

Figure 9:
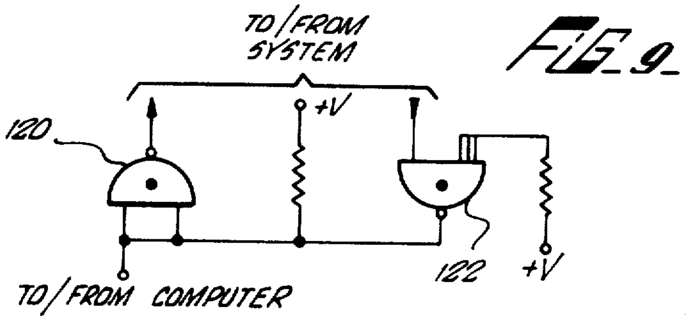
FIG. 9 is a schematic logic diagram illustrating a typical receiver/transmitter arrangement that may be used in an interface unit in conjunction with the subject system.

The bank of interface transmitters and receivers 108 may be of any conventional configuration well known in the prior art. Typically, as shown by FIG. 9 the transmitters and receivers may simply include a pair of gating devices such as a pair of NAND gates 120 and 122 which are respectively connected to apply signals between the computer 30 and the system. The transmitter gates 120 and the receiver gates 122 also may be employed separately as required. A computer 30, i.e., a Varian DATA 620/*i* Computer, having sixteen or more input lines over which data and command signals are transferred would require the use of an appropriate number of transmitters and/or receivers.

In the subject system the NAND gate 122 serves as a receiver and is connected to one of the sixteen output lines **106*n* of the sixteen multiplexer stages. Command signals from the computer 30 would be applied to the transmitter NAND gate 120 for appropriate application to the other components of the interface/control subassembly 28**, as is described in greater detail.

The mode control circuit 110 provides enabling signals to the multiplexer control circuit 112, the buffer reset circuit 114 and the entry lamp control circuit 116 in response to a proper command from the computer 30. Typically, the computer 30 will alternate between command periods, in which computer commands are provided to the system, and input periods in which data is transferred to the computer 30 for appropriate authentication, storage, etc. Command signals applied from the computer 30 to the mode control circuit 110 thus serves to enable desired data to be transferred to the computer 30 during time periods in which the computer 30 is operationally primed to receive the data.

The transfer of data to the computer 30 is "mechanically" controlled by the multiplexer control circuit 112 which operates to provide appropriate binary addresses to the respective sixteen multiplexer stages included in the multiplexer 26 to effect the earlier mentioned scanning or interrogation of the 128 buffers in a system. These addresses are provided by the computer 30 in accordance with a computer program defining a predetermined sequence in which the respective data buffers 22 are to be scanned.

Figure 10:
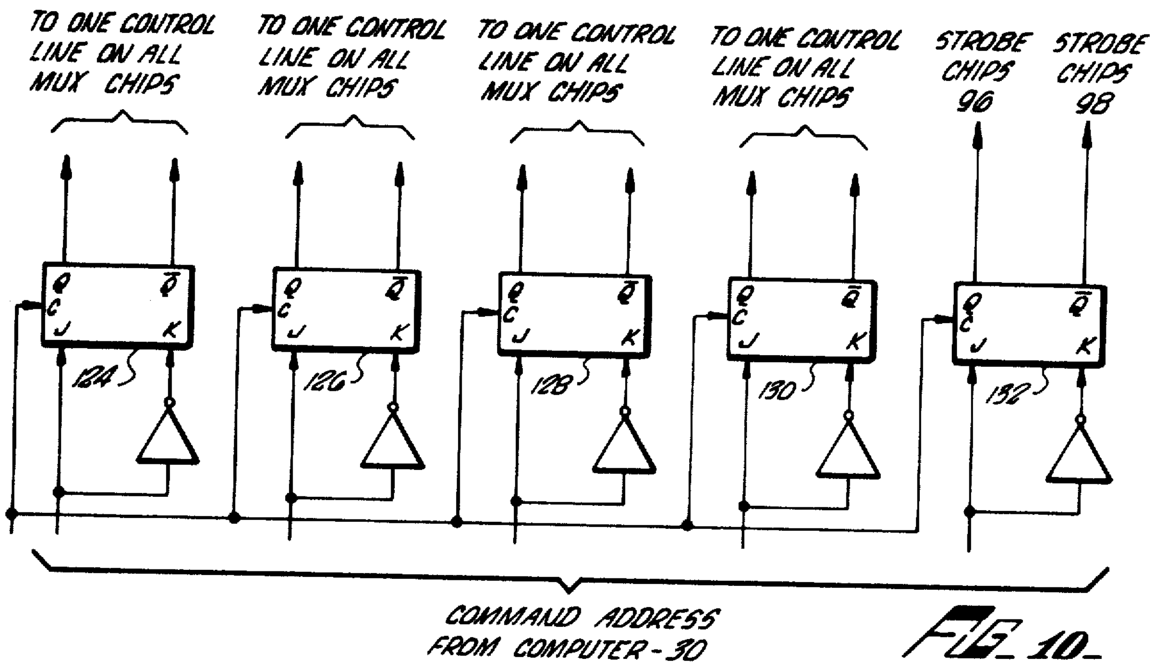
FIG. 10 is a schematic diagram illustrating an exemplary multiplexer control circuit.

The multiplexer control circuit 112 provides a means by which the respective multiplexer stages of the multiplexer 26 are selectively addressed and may be fabricated by using any of the conventional techniques well known in the prior art. For example, the multiplexer control circuit 112 may be a decoder of any well known variety. As shown by FIG. 10, the multiplexer control circuit 112 may include a plurality of flip-flop circuits 124, 126, 128, 130 and 132. Four of these flip-flops, i.e., the flip-flops 124, 126, 128, and 130, are respectively adapted to have their pairs of output terminals (Q and Q) appropriately connected to provide a control signal to one of the four control lines provided on each of the multiplexer chips 96 and 98 (FIG. 8) included in each of the sixteen multiplexer stages. The remaining one of the five flip-flops, i.e., the flip-flop 132, may be used to provide a strobe signal to the multiplexer chips 96 and 98 forming each of the sixteen multiplexer stages. Accordingly, a Q output of the flip-flop 132 may be connected to strobe the multiplexer chips 96 (of each of the sixteen stages) while the Q terminal of the flip-flop 132 is connected to strobe each of the multiplexer chips 98. As such, only one of the two multiplexer chips 96 and 98, of each multiplexer stage, will be strobed by the multiplexer control circuit 112 at any given time, the signals provided over the four control lines defining which of the sixteen data input leads on the strobed multiplexer chip is to be provided at the output terminal thereof.

Clock pulse signals may be applied to the respective flip-flops 124, 126, 128, 130 and 132 from a suitable clock pulse generator in any fashion well known in the prior art.

The multiplexer control circuit 112 is intended to be controlled such that each of the 128 data buffers 22 in the system are systematically interrogated or scanned whenever a priority interrupt signal is applied from the priority interrupt generator 24 to the computer 30. The manner of scanning may be accomplished in the earlier described fashion under the control of a computer program which would serve to define which data buffers actually form the exemplary thirty-two groups of four. Obviously, any four of the one hundred twenty-eight buffers may be grouped. For purposes of simplicity, the buffers 001-004 may be grouped, the buffers 005–008 may be grouped, etc.

The computer program concerning the sequence in which data buffers 22 are scanned, and reset, may provide that each buffer be interrogated twice before a succeeding group of four buffers is interrogated. Such a redundant interrogating technique may serve to permit the authentication of the signals transferred to the computer 30 to limit transmission errors.

Operationally, upon a binary word being transferred from a buffer 22 to the computer 30, the buffer is reset by the application of a reset signal via a lead 94 (see FIG. 5). The provision of reset signals and the application thereof to a selected buffer 22 may be readily accomplished by employing a decoder circuit, of any conventional configuration.

Figure 11:
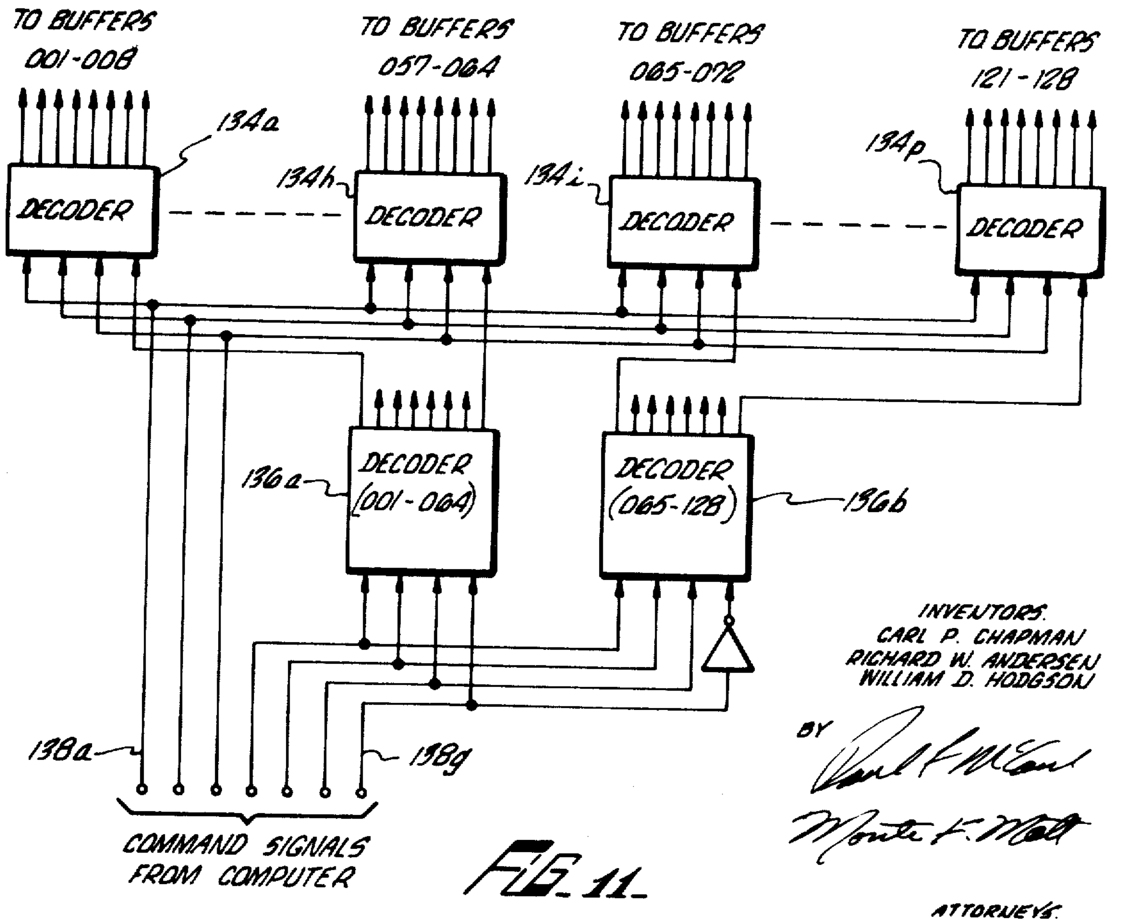
FIG. 11 is a schematic logic diagram illustrating an exemplary decoding circuit that may be used as a buffer reset circuit or lamp control circuit.

FIG. 11 illustrates an exemplary circuit configuration that may be used to satisfy the required function of the buffer reset circuit 114. As shown, the buffer reset circuit 114 may include a plurality of individual decoder circuits **134*a*–134*p* (circuits 134*b*–134*g* and 134*j*–134*o*, not illustrated) which are arranged in a first tier and a pair of decoder circuits 136*a* and 136*b* arranged in a second tier. Each of these decoder circuits 134*a*–134*p*, 136*a* and 136*b*** may be of any suitable commercially available type, such as decoder circuits type SB7442 made available by Texas Instrument Company.

The illustrated configuration for the buffer reset circuit 114 simply enables a reset signal to be applied from an output of one of the decoder circuits **134*a* to 134*p* to a selected data buffer 22. The appropriate decoder output line, connected to the desired buffer, is selected by the application of address signals to seven input lines 138*a* to 138*g*. These address signals may be in the form of binary command signals from the computer 30.**

The entry lamp control circuit 116 and the entry lamp driver circuit 118 serve the function of illuminating the earlier discussed entry lamp 42 that may be provided on the keyboard (see FIG. 2) of a data terminal 20. Assume that the entry lamp 42 is to be illuminated upon the transfer of five binary words, for a complete five digit decimal word, to the computer 30. The entry lamp driver circuit 118 may simply be an array of switches that are adapted to be selectively enabled to provide power to an entry lamp of a selected keyboard. Each of the switches in a driver circuit 118 may be adapted to be primed by reset signals from a buffer reset circuit 114 via a plurality of leads 140 (FIG. 1). Operation of a primed switch may then occur in response to address command signals from the computer 30 after the transfer of the fifth or last binary word corresponding to a decimal word inputted at the data terminal 20. Operation of a switch may involve, for example, the closure thereof.

The entry lamp control circuit 116 may be of any decoder circuit well known in the prior art. The decoder circuit illustrated by FIG. 11, for example, would be suitable for use as an entry lamp control circuit 116. It is to be noted that the decoder circuit illustrated by FIG. 11 does not include leads 140 (see FIG. 1) adapted to be connected to provide priming signals to the entry lamp driver circuit 118. However, such lead or leads may be easily provided by a redundant configuration or by simply connecting the outputs of the respective circuits **134*a* to 134*p* to the respective one hundred twenty-eight primary input terminals of the entry lamp driver circuit 118 in addition to the buffers 22.**

To summarize the operation of the subject system, binary words are developed at the data terminals 20 in response to the depression of buttons on a terminal keyboard (FIG. 2). These binary words are stored in data buffers 22 for transfer to the computer 30. The data buffers 22 respond to the application of binary words thereto by providing a "full" signal to the priority interrupt generator 24 (FIG. 4) which in turn responds by providing a priority interrupt signal to the typically provided priority interrupt module of the computer 30. The computer 30 responds to a priority interrupt signal by providing commands to the interface/control sub-assembly 28 which effects transfer of the stored binary words. This transfer is accomplished by the multiplexer 26 being controlled by a multiplexer control circuit 112 to interrogate or scan the buffers 22 as directed by address commands from the computer 30 and in accordance with a programmed sequence. For example, one hundred twenty-eight terminals 20, and corresponding buffers 22, may be scanned by groups of four if optimum use is made of sixteen computer input/output terminals. The scanning of the buffers 22 may involve a redundant format to allow for verification of transferred binary words. Each buffer 22 from which a binary word is transferred to the computer 30 is reset, and thereby primed to receive another binary word, in response to a reset pulse provided by the buffer reset circuit 114 which also responds to address commands from the computer 30. After five successive binary words, corresponding to a complete decimal word, have been transferred to the computer 30, the entry lamp 42 (FIG. 2) may be illuminated by operation of the entry lamp control circuit 116 and the entry lamp driver circuit 118. The buffer reset circuit 114 may provide a priming signal to the entry lamp driver circuit 118.

In a typical school situation, the data terminals 20 will be used at random, on a real time basis. For the first ten to fifteen minutes of an exemplary fifty minutes class period, the priority interrupt generator 24 may be continually applying a signal to the priority interrupt module of the computer 30. The multiplexer control circuit 112 would thus be continually controlling the multiplexer 26 to interrogate the groups of buffers 22 and binary words would be continually transferred during standard input periods to the computer.

In short, each of the data terminals 20 would be independently operated and controlled by the computer 30. Accordingly, each of the buffers 22 may be reset on an individual basis and the keyboard entry lamps 42 illuminated on an individual basis without regard to the degree of progress of activity at other data terminals 20.

The data terminals 20 may be made relatively secure against improper usage by requiring that a teacher, for example, gain access to the terminal before any student data is accepted at the computer. This access routine may require that the teacher depress the keyboard buttons corresponding to a personal identification number and function (dot). This identification number may then be authenticated by a comparison operation with teacher data stored in the computer memory to determine that a proper teacher identification number has been inserted. The authentication may even require, if practical, that a teacher be properly corresponded with a selected classroom (data terminal 20) at predetermined times during the day such that a teacher in the wrong classroom may not gain access to the data terminal at the wrong location. Teachers may then relinquish access such that the terminal is again secure against improper usage.

Provisions may be made to have all terminals 20 automatically closed down or relinquished at the end of class periods under the control of the computer 30 in accordance with a computer program.

From the foregoing it is now clear that the present invention provides an automated accounting system that is suitable for use at an educational institution for continually collecting, consolidating, updating and maintaining student information. It is to be understood that the employment of auxiliary equipment such as a memory 26 is dictated by the size of a student body and the retrieval and manipulation of information stored in the memory of the computer 30, and an auxiliary memory 36, may be readily controlled by any one or more computer programs that are written to have the computer 30 perform a succession of desired operations.

While a preferred embodiment of the present invention has been described hereinabove, it is intended that all matter contained in the above description, and shown in the accompanying drawings be interpreted as illustrative and not in a limiting sense and that all modifications, constructions and arrangements which fall within the scope and spirit of the present invention may be made.

What is claimed is:

1. A data processing system of the type adapted to provide data to a computer memory from a plurality of individual locations, the system comprising:

a plurality of data terminal means positioned at said individual locations for enabling the entry of data words including a plurality of data digits into said computer memory from each of said individual locations, said terminal means adapted to provide coded digit signals representative of said data words;

a plurality of buffer means for storing coded digit signals received from corresponding data terminal means connected thereto, each of said buffer means connected to a single one of said plurality of data terminal means, said buffer means providing a full signal in response to the presence of a stored coded digit signal;

multiplexer means, connected to each of said plurality of buffer means, for concurrently interrogating selected groups of said buffer means to enable stored coded digit signals to be concurrently provided to said computer memory from said selected groups of said buffer means, said stored coded digit signals being provided to said computer memory via said multiplexer means; and control means for controlling said multiplexer means to interrogate said selected groups of buffer means in a temporal sequence defined by command signals applied to said control means.

2. The system defined by claim 1 further including reset means for clearing each said buffer means subsequent to said stored coded digit signals being provided therefrom to said computer memory.

3. The system defined by claim 1 further including means for providing a visual entry indication at said data terminal means whenever a preselected number of coded digit signals corresponding to a data word entered at said terminal means have been provided to said computer memory.

4. The system defined by claim 1 wherein said data terminal means are situated at different ones of said locations and are each adapted to be independently operated to enter data words.

5. The system defined by claim 4 wherein said terminal means each include:

means for permitting the successive entry of data digits; and encoding means for providing coded digit signals in response to the entry of each said data digit.

6. The system defined by claim 1 wherein said multiplexer means is adapted to receive stored coded digit signals from each said selected group of buffer means, for transfer to said computer memory, whenever each said selected group of buffer means are interrogated, said control means providing address signals to said selected groups of buffer means in response to said command signals, said address signals controlling the interrogation of said selected groups of buffer means by said multiplexer.

7. The system defined by claim 6 wherein said buffer means each include:

storage means for storing coded digit signals applied to said buffer means, said coded digit signal remaining stored until said buffer means is cleared; and means for providing said full signal in response to a coded digit signal being stored in said buffer means.

8. The system defined by claim 7 wherein said plurality of terminal means are each situated at different ones of said locations and are adapted to be independently operable, said terminal means each including:

means for permitting the successive entry of data digits; and encoding means for providing coded digit signals in response to the entry of each said data digit.

9. The system defined by claim 8 further including reset means for clearing each buffer means subsequent to the coded digit signal stored therein being provided to said computer memory.

10. The system defined by claim 9 further including means for providing an entry indication at said plurality of terminal means from which a preselected number of coded digit signals, corresponding to a data word, have been provided to said computer memory.

11. The system defined by claim 10 wherein said multiplexer means is adapted to interrogate selected groups of said buffer means in a predetermined succession, said control means providing address signals to said multiplexer means in response to said command signals, said address signals controlling said succession.

12. An automated student accounting system for enabling the insertion of student information from a plurality of locations to a central data storage facility, said system comprising:

a plurality of terminal means for enabling the entry of student information expressed as decimal words including a multiplicity of decimal digits and at least one function digit, said terminal means providing binary coded decimal signals representative of said decimal and function digits;

a plurality of buffer means, corresponding to said plurality of terminal means, for temporarily storing said binary coded decimal digits applied thereto by operation of a terminal means connected thereto;

multiplexer means, connected to each of said plurality of buffer means, for selectively interrogating said buffer means to effect transfer of said stored binary coded decimal signals to said central data storage facility, said multiplexer means being operated to concurrently interrogate selected groups of said buffer means in accordance with a preselected sequence, said stored binary coded decimal signals being transferred from said buffer means to said central data storage facility through said multiplexer; and reset means for clearing said buffer means subsequent to the transfer of any binary coded decimal signals temporarily stored therein.

13. The apparatus defined by claim 12 wherein said multiplexer includes a plurality of stages each adapted to be operatively connected to selected ones of said buffer circuits to concurrently interrogate said selected groups of buffer means in accordance with said preselected sequence.

14. The apparatus defined by claim 12 further including means adapted to be operatively connected to each of said plurality of terminal means and said central data storage facility for providing at said terminal means an entry indication whenever a preselected number of binary coded decimal signals have been transferred therefrom to said central data storage facility.

15. The apparatus defined by claim 12 wherein said plurality of terminal means are situated at different ones of said locations, said terminal means including:

encoding means for converting each of said decimal and function digits to a binary word having a plurality of binary bits; and entry means for applying said decimal and function digits to said encoding means, said binary coded decimal signals being representative of said binary words.

16. The apparatus defined by claim 15 wherein said encoding means includes:

a plurality of output leads corresponding in number to the number of binary bits in said binary words;

a plurality of input leads corresponding in number to the number of different decimal and function digits; and means for connecting each of said input leads to predetermined ones of said output leads to provide selected binary coded decimal signals at said output leads for each of said different decimal and function digits.

17. The apparatus defined by claim 16 wherein said entry means includes a plurality of switching devices corresponding in number to said number of different decimal and function digits, each of said switching devices being operatively connected to a different one of said input leads, a different binary coded decimal signal being provided at said output leads in response to the operation of each switching device, said different binary coded decimal signals respectively corresponding to the decimal or function digit associated with the switching device that has been operated.

18. The apparatus defined by claim 12 wherein said binary coded decimal signals each include a binary word having a preselected number of binary bits, each buffer means including:

a plurality of channels each corresponding to one of said binary bits in a binary word, each said channel having:

pulsing means responsive to the application of a selected binary coded decimal signal for providing a pulse; and latching means for providing a buffer signal having a preselected amplitude level in response to the application thereto of a pulse from said pulsing means, the buffer signals provided by said channels collectively representing a stored binary coded decimal signal; and means for providing an interrupt signal in response to said buffer signals.

19. The apparatus defined by claim 18 further including means responsive to said interrupt signals for providing priority instruction signals, said central data storage facility enabling said multiplexer means to interrogate said buffer means in response to said priority instruction signals.

20. The apparatus defined by claim 19 wherein said plurality of terminal means each include:

entry means for enabling the entry of decimal and function digits to a terminal means; and encoding means, responsive to the entry of decimal and function digits, for providing said binary words representing said digits as a binary coded decimal signal.

21. The apparatus defined by claim 20 wherein said encoding means includes:

a plurality of output leads, each output lead corresponding to one of said preselected number of bits forming said binary words;

a plurality of input leads, each input lead corresponding to one of the different decimal digits and function digits; and means for connecting each of said input leads to a selected combination of said output leads.

22. The apparatus defined by claim 21 wherein said entry means includes a plurality of switching devices, each switching device being operatively connected to a different one of said input leads, a binary coded decimal signal being provided at said output leads in response to the operation of a switching device, said binary coded decimal signal corresponding to the decimal or function digit represented by the input lead operatively connected to the operated switching device.

23. The apparatus defined by claim 22 wherein said multiplexer means is adapted to receive said buffer signals from each of said buffer means, said multiplexer means including a plurality of stages that are each adapted to be successively connected to selected groups of said buffer means in accordance with a preselected sequence, said buffer signals being concurrently provided from said selected groups of buffer means to said central data storage facility in accordance with said preselected sequence.

24. The apparatus defined by claim 23 further including means adapted to be connected to said plurality of terminal means and said central storage facility for providing an entry indication at operated ones of said plurality of terminal means whenever a predetermined number of said buffer signals produced by an operated terminal means have been received at said central data storage facility.

25. A machine performed process for enabling the insertion of multidigit data words to a computer memory from a plurality of data terminals each having a buffer storage device adapted to store digit words, the buffer storage devices being interrogated in groups in accordance with said process which includes the steps of:

selecting a first predetermined group of buffer storage devices;
interrogating said group of buffer storage devices;
transferring any digit words stored in the interrogated buffer storage devices to said computer memory;
clearing the buffer storage devices from which stored digit words have been transferred; and
selecting the next predetermined group of buffer storage devices.

26. The process defined by claim 25 wherein the step of transferring includes the steps of:

reading a stored digit word; and
confirming the authenticity of said stored digit word by re-reading said stored digit word.

27. The process defined by claim 26 further including the step of providing an entry signal at data terminals corresponding to buffer storage devices from which a predetermined number of stored digit words have been transferred to said computer memory.

* * * * *